United States Patent
Lilleberg et al.

(10) Patent No.: US 7,269,207 B2
(45) Date of Patent: Sep. 11, 2007

(54) METHOD OF SYMBOL INDEX SELECTION IN CODE DIVISION MULTIPLE ACCESS

(75) Inventors: Jorma Lilleberg, Oulu (FI); Kim Rounioja, Oulu (FI); Thomas A. Sexton, Fort Worth, TX (US)

(73) Assignee: Nokia Corporation, Espoo (FI)

( * ) Notice: Subject to any disclaimer, the term of this patent is extended or adjusted under 35 U.S.C. 154(b) by 726 days.

(21) Appl. No.: 10/359,472

(22) Filed: Feb. 5, 2003

(65) Prior Publication Data

US 2004/0151236 A1    Aug. 5, 2004

(51) Int. Cl.
*H04B 1/00* (2006.01)
(52) U.S. Cl. .................. 375/152; 375/130; 375/141; 375/142; 375/147; 375/148; 375/150; 375/151
(58) Field of Classification Search ................ 375/152, 375/130, 141, 142, 147, 148, 150, 151, 232, 375/343; 370/209, 335, 342

See application file for complete search history.

(56) References Cited

U.S. PATENT DOCUMENTS 4,620,192 A * 10/1986 Collins ................... 342/128

OTHER PUBLICATIONS

"Efficiently Computed Reduced-Parameter Input-Aided MMSE Equalizers for ML Detection: A Unified Approach"; Al-Dhahir et al.; IEEE Transactions on Information Theory, vol. 42, No. 3; May 1996; pp. 903-915.
"Chip-Interleaved Block-Spread Code Division Multiple Access"; Zhou et al.; IEEE Transactions on Information Theory, vol. 50, No. 2; Feb. 200296; pp. 235-248.
"Simple MMSE Equalizers for CDMA Downlink to Restore Chip Sequence: Comparison to Zero-Forcing and Rake"; Krauss et al.; ICASSP; 2000; pp. 2865-2868.
"Downlink Channel Decorrelation in CDMA Systems with Long Codes"; Werner et al.; VTC 1999-Fall—50th IEEE International Vehicular Technology Conference, Amsterdam, Netherlands; Sep. 19-22, 1999; pp. 1614-1617.

* cited by examiner

*Primary Examiner*—Jean B. Corrielus
*Assistant Examiner*—Nader Bolourchi
(74) *Attorney, Agent, or Firm*—Ware, Fressola, Van Der Sluys & Adolphson LLP (57) ABSTRACT

A method and device for estimating a target chip index value in a code-division multiple access receiver. The receiver receives signals from a transmitter that uses a plurality of transmitted chips for data transmission through a plurality of multipath channels. As each channel is expressible as a channel impulse response at a given instant in time, the impulse response can be sampled and the samples indexed by a plurality of delay sample indices. The target chip index value can be determined based on the first moment of the delay sample indices over an impulse response.

17 Claims, 4 Drawing Sheets

METHOD OF SYMBOL INDEX SELECTION IN CODE DIVISION MULTIPLE ACCESS

FIELD OF THE INVENTION

The present invention relates generally to a code-division multiplex access multi-user communications system and, more particularly, to inter-chip interference reduction in such a communications system.

BACKGROUND OF THE INVENTION

A code-division multiple access (CDMA) system uses orthogonal spreading codes for simultaneous transmissions of data for multiple users over the same bandwidth. When the chip-rate increases, especially in the high-speed downlink packet access (HSDPA) extension of wideband code-division multiple access (WCDMA), the underlying multipath channels become frequency selective, destroying the code orthogonality and causing inter-chip interference. Inter-chip interference limits the system capacity and the availability of high data rate services.

Figure 1:
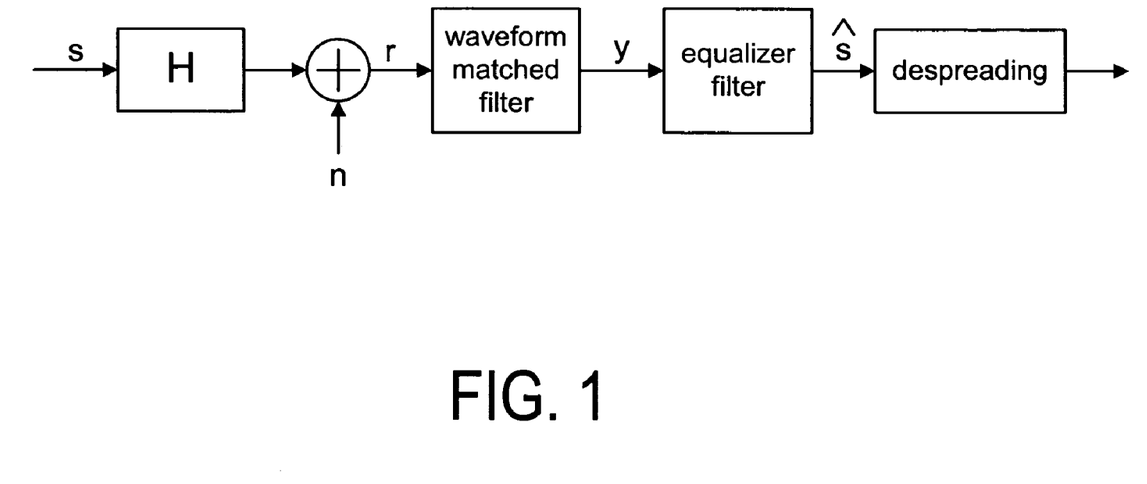
FIG. 1 is a schematic representation showing the transmission and reception of communication signals through a plurality of multipath channels.

To suppress the interference in the downlink, a linear equalization scheme has been proposed for partially restoring the orthogonality of the users' spreading codes. In particular, a linear filter of length N with certain taps is used to produce an equalized output, as shown in FIG. 1. As shown in FIG. 1, a sequence of transmitted chips, s, is used for data transmission through a plurality of multipath channels h. At the receiver, a signal r is received. After the received signal r is filtered by a chip-waveform matched filter, a sequence of samples, y, is observed. Taking noise, n, into account, the received sample sequence can be expressed as $$y = Hs + n \qquad (1)$$

where H is the Sylvester convolution matrix seen in the expanded matrix representation below:

$$\begin{bmatrix} y_0 \\ y_1 \\ y_2 \\ y_3 \\ y_4 \\ y_5 \end{bmatrix} = \begin{bmatrix} h_2 & h_0 & & & \\ h_3 & h_1 & & & \\ & h_2 & h_0 & & \\ & h_3 & h_1 & & \\ & & h_2 & h_0 \\ & & h_3 & h_1 \end{bmatrix} \begin{bmatrix} s_0 \\ s_1 \\ s_2 \\ s_3 \end{bmatrix} + \begin{bmatrix} n_0 \\ n_1 \\ n_2 \\ n_3 \\ n_4 \\ n_5 \end{bmatrix} \qquad (2)$$

In this matrix representation, $h = \{h_0, h_1, h_2, h_3\}$ and there are two samples per chip in to the equalizer. As h is the overall impulse response, it includes the effects of the transmit and receive filters.

For a target chip index D, it is possible to calculate the delay-dependent taps $x(D)$ so as to produce an equalized chip $\hat{s}_D$, which is the minimum mean square error (MMSE) estimate of the $D^{th}$ chip transmitted, $s_D$, with an error variance $P_D$. In the example above, for $y = \{y_0, \ldots, y_5\}$, the possible chips to estimate come from $s = \{s_0, s_1, s_2, s_3\}$ so that D is chosen from $\{0, 1, 2, 3\}$. The filter construction means that one chip is estimated at a time. The problem is to decide, given a sequence of $y_k$ values, with k being the sample index, which chip should be estimated. In other words, it is necessary to decide the value of target chip index D.

Al-Dhahir et al. ("Efficiently Computed Reduced-Parameter Input-Aided MMSE Equalizers for ML Detection: A Unified Approach", IEEE Transactions on Information Theory, Vol. 42, No. 3, May 1996) has shown that the effect of the delay parameter on output signal-to-noise ration (SNR) is significant. A non-optimized delay could result in an appreciable performance degradation. Thus, it is important to estimate the delay parameter.

Krauss et al. ("Simple MMSE Equalizers for CDMA Dowlink to Restore Chip Sequence: Comparison to Zeroforcing and Rake", ICASSP 2000) has shown a way to calculate the value of target chip index D by first solving for the error variance $P_D$ and then choosing $$D = \arg\min (P_D) \qquad (3)$$

According to Krauss et al., the minimization of the MMSE gives the filter, x, as the solution of linear equations $Ax = b$, where $A = \sigma_s^2 HH' + \sigma_n^2 I$, $b = \sigma_s^2 H\delta_D$, $\sigma_n^2$ is the variance of the noise term n, and H' is the Hermetian transpose of H. The x, which is the solution of the system of linear equations, represents the taps of the chip level equalizer. The evaluation of the MMSE as a function of D results in $$MMSE(D) = \sigma_s^2 (1 - x(D)h_D), \qquad (4)$$

where $h_D$ is the channel impulse response shifted by D chip periods, and $x(D)$ is the Hermetian transpose of $x(D)$. By finding MMSE(D) for $D = 1, \ldots, N$, the value of the target chip index D to be estimated is the D that gives the smallest MMSE. This process for finding all the MMSE values is equivalent to computing the complete inverse of A in order to solve for x in a system of linear equations $Ax = b$.

While the value of target chip index, D, as determined in Krauss et al., can be used to reduce the output mean-square error (MSE), the computation is complex due to the process of solving $A^{-1}$. This requires the computation of inverse of the matrix A thousands of times per second.

It is advantageous and desirable to provide a simple method and device for estimating the value of target chip index D.

SUMMARY OF THE INVENTION

The present invention provides a method and device for computing the target chip index value without performing the computation of matrix conversion.

According to the first aspect of the present invention, there is provided a method of estimating a target chip index value in a code-division multiple access system, wherein a plurality of transmitted chips are used for data transmission through a plurality of channels and wherein each of the channels at a given instant in time is expressible as an instantaneous impulse response, the impulse response sampled into a plurality of samples indexed by a plurality of delay sample indices. The method is characterized by:

computing a first moment of the delay sample indices over the instantaneous channel impulse response, and determining the target chip index based on the computed first moment.

Advantageously, when a filter is used in a receiver in the code-division multiple access system for filtering the data received in the receiver, and the filter is derivable from the target chip index, the method is further characterized by:

choosing a plurality of chip index values based on the computed first moment;

associating said plurality of chip index values to a plurality of filters; and evaluating filtering performance of said plurality of filters so as to determine the target chip index among said plurality of chip index values based on the filtering performance.

The chip index values can be equal to, greater or smaller than the computed first moment.

Alternatively, when a filter is used in a receiver in the code-division multiple access system for filtering the data received in the receiver, and the filter is derivable from a noise-minimizing solution based on a plurality of impulse channel responses, the method is characterized in that said determining is also based on the noise-minimizing solution.

Advantageously, the data transmission is carried out in time slots, and the method is further characterized by:

computing a first index value indicative of an average value of the noise-minimizing solution over a plurality of time slots;

computing a second index value indicative of an average value of the first moment over said plurality of time slots; and computing a correlation coefficient between the first index value and the second value so as to determine the target chip index based on the correlation coefficient.

Preferably, the first index value is a zero mean component of the average value of the noise-minimizing solution over said plurality of time slots; and the second index value is a zero mean component of the average first moment over said plurality of time slots, wherein the target chip index is derived from the first moment if the correlation coefficient exceeds a predetermined value.

Advantageously, if the correlation coefficient is smaller than the predetermined value, the target chip index is derived from a constant value different from the computed first moment, or from a noise-minimizing solution if the correlation coefficient is smaller than the predetermined value.

The predetermined value can be equal to, greater or smaller than 0.8.

According to the second aspect of the present invention, there is provided a signal filtering device to be used in a receiver in a code-division multiple access system, wherein a plurality of transmitted chips are used in a transmitted signal for data transmission through a plurality of channels and each of the channels at a given instant in time is expressible as an instantaneous impulse response, the impulse response sampled into a plurality of samples indexed by a plurality of delay sample indices, and wherein the receiver comprises:

means for receiving the transmitted signal, and a chip-waveform matched filter, responsive to the received signal, for providing a user-specific received signal. The signal filtering device is characterized by:

means, responsive to the user-specific received signal, for computing a first moment of the delay sample indices over the instantaneous channel impulse response, and means, responsive to the computed first moment, for determining the target chip index based on the computed first moment.

Advantageously, when the signal filtering device further comprises a further filter for filtering the user-specific received signal, said further filter derivable from the target chip index, the signal filtering device is further characterized by:

an algorithm, responsive to the computed first moment, for choosing a plurality of chip index values based on the computed first moment, associating said plurality of chip index values to a plurality of further filters, and evaluating filtering performance of said plurality of further filters so as to allow the determining means to determine the target chip index among said plurality of chip index values based on the filtering performance.

Advantageously, the further filter is derivable from a noise-minimizing solution based on a plurality of impulse channel responses, and the signal filtering device is characterized in that the determining means also determines the target chip index based on the noise-minimizing solution.

Advantageously, the data transmission is carried out in time slots, and the device is further characterized by:

an algorithm, responsive to the user-specific received signal and the computed first moment, for computing a first index value indicative of an average value of the noise-minimizing solution over a plurality of time slots, and a second index value indicative of an average value of the first moment over said plurality of time slots, and computing a correlation coefficient between the first index value and the second value so as to allow the determining means to determine the target chip index based on the correlation coefficient.

The first index value is a zero mean component of the average value of the noise-minimizing solution over said plurality of time slots; and that According to the third aspect of the present invention, there is provided a radio-frequency receiver for receiving a communication signal in a code-division multiple access system, wherein a plurality of transmitted chips are used in a transmitted signal for data transmission through a plurality of channels, each of the channels at a given instant in time is expressible as an impulse response, the impulse response sampled into a plurality of samples indexed in a plurality of delay sample indices. The receiver comprises:

means for receiving the transmitted signal, and a chip-waveform matched filter, responsive to the received signal, for providing a user-specific received signal. The receiver is characterized by:

means, responsive to the user-specific received signal, for computing a first moment of the delay sample indices over the impulse response, and means, response to the computed first moment, for determining a target chip index value based on the computed first moment.

According to the fourth aspect of the present invention, there is provided a mobile terminal for communicating with at least one base station in a telecommunications network through a plurality of channels in a code-division multiple access fashion, wherein the base station uses a plurality of transmitted chips in a transmitted signal for data transmission through the plurality of channels, each of the channels in a given instant in time is expressible as an impulse response, the impulse response sampled into a plurality of samples indexed in a plurality of delay sample indices. The mobile terminal comprises:

an antenna for receiving the transmitted signal, and a chip-waveform matched filter, responsive to the received signal, for providing a user-specific received signal. The mobile terminal is characterized by:

an algorithm, response to the user-specific received signal, for computing a first moment of the delay sample indices over the impulse response, and determining a target chip index based on the computed first moment.

The present invention will be apparent upon reading the description taken in conjunction with FIGS. 1 to 4.

BEST MODE TO CARRY OUT THE INVENTION

It has been found that while the distribution of h over k changes with time, there is a correlation between the distribution of h at a later time and a high value of D being optimal, where D is calculated from the distribution of h at an earlier time. The correlation is especially strong when the number of equalizer taps, N, is small. Thus, the present invention uses the center-of-mass of the overall channel impulse response to calculate a value $D_c$ and uses this value for the target chip index D. The center-of-mass, $D_c$, is calculated as the first moment of k, treating h as a distribution.

$$D_c = \frac{\sum_{k=k0}^{L} |h(k)| k}{\sum_{k=k0}^{L} |h(k)|} \quad (5)$$

where L is the channel length (L<N), with N being the number of equalizer taps, and $k_0$ is a fixed constant. The constant $k_0$ is chosen so that the average value of $D_c$ is about N/2. In WCDMA HSDPA applications, it is preferred that the value $D_c$ is calculated once per slot (every 0.66 ms).

Figure 2:
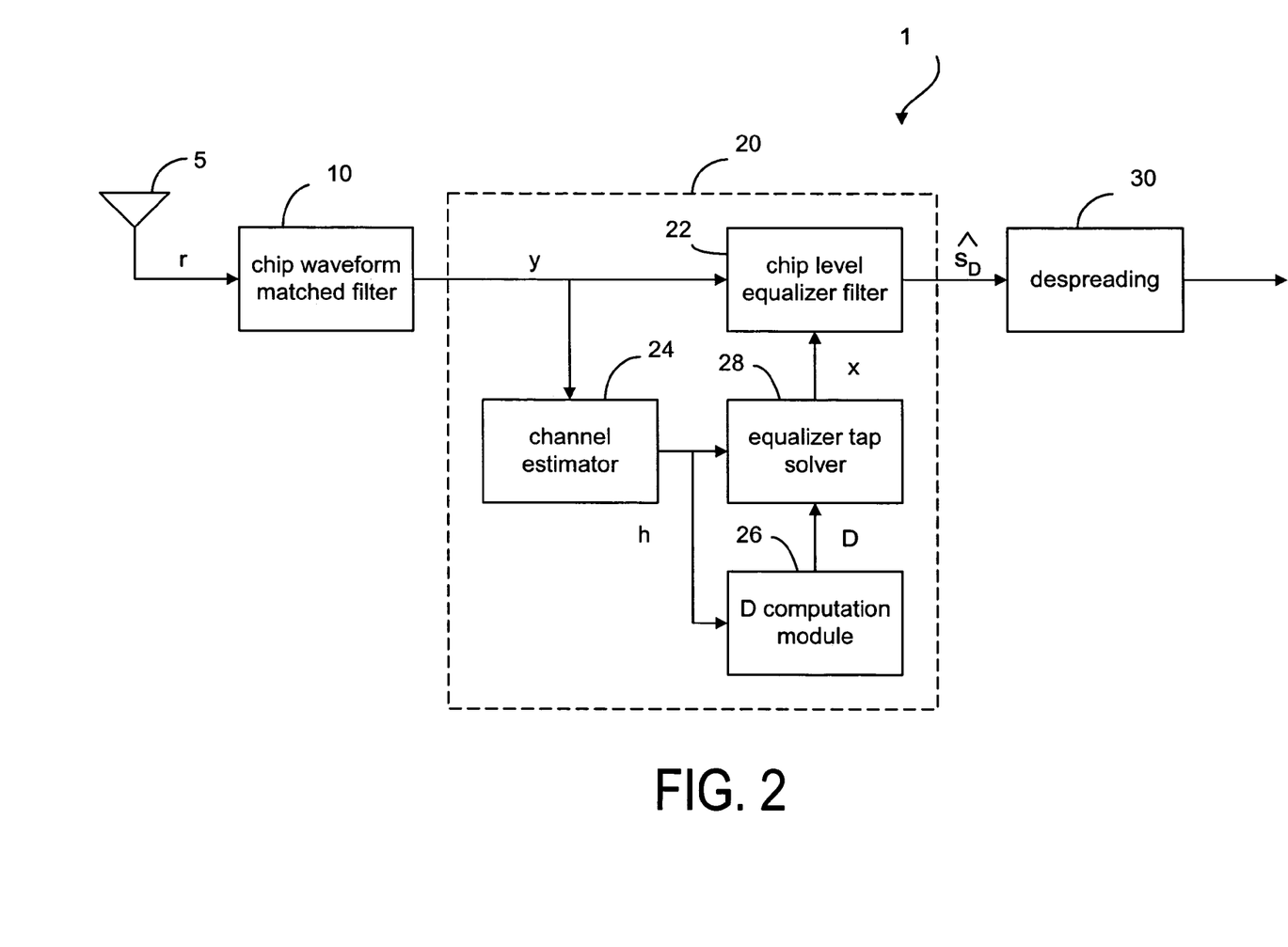
FIG. 2 is a block diagram showing a receiver with chip equalizer taps, according to the present invention.

The receiver, which is capable of carrying out the present invention, is shown in the block diagram of FIG. 2. As shown, the receiver 1 has a chip waveform matched filter 10 at the front-end to match the user's signature waveform. At the output of the front-end matched filter 10, a sequence of the received samples y(k) is obtained, wherein 0≦k<L. The receiver 1, according to the present invention, also includes a filtering module 20 for providing equalized chips $\hat{S}_D$ based on the received samples y(k). The filtering module 20 includes a channel estimation module 24 for obtaining a sequence of impulse responses h(k) based on the received sample y(k). With the impulse responses h(k), a center-of-mass computation module 26 computes the target chip index D. Afterward, the sample vector is despread with a proper despreading code by a despreading module 30, which is known in the art.

With the estimated target chip index D and the impulse response h, it is possible to obtain the equalizer filter taps x by an equalizer tap solver 28 so that a linear filter 22 of length N with the taps x can be constructed for obtaining the equalizer chips $\hat{S}_D$.

Figure 3:
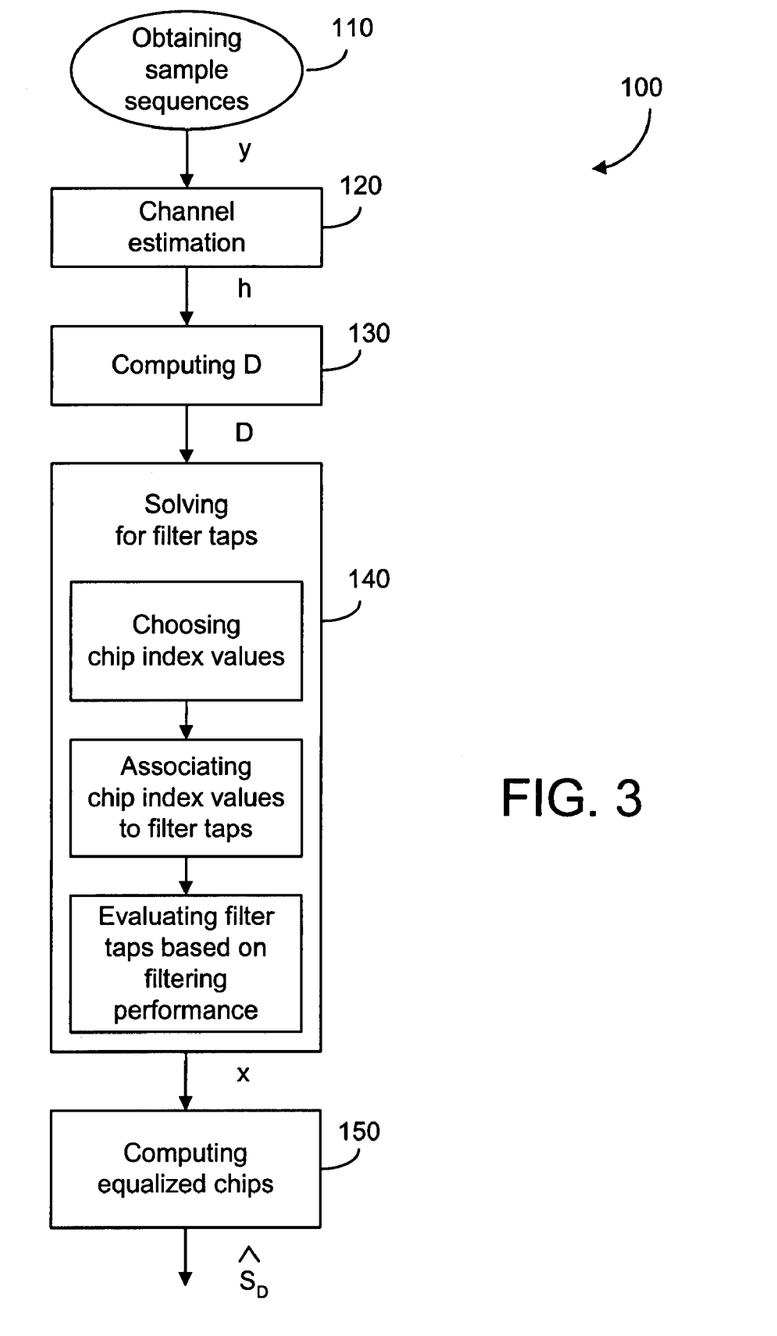
FIG. 3 is a flowchart showing the method of estimating the sample index in chip level equalization, according to the present invention.

The method of estimating the target chip index, or the value of the target chip index, D, according to the present invention, is shown in FIG. 3. As shown in the flowchart 100, after the sequence of received samples y(k) is obtained at step 110, a channel estimator is used to provide a series of impulse responses h(k) at step 120. It is followed by the determining of the target chip index D using the center-of-mass method at step 130. With the center-of-mass method, the value of D is determined based on the channel impulse response, h, for the current slot. In the alternative embodiment, statistics collected over slots are used to determine intermediate parameters. Using the estimated D value, the equalizer filter taps x are determined by an equalizer tap solver at step 140 so that the equalized chips $\hat{S}_D$ can be obtained at step 150.

In some channels, where the use of center of mass $D_c$ does not improve the performance over the use of a fixed value (Pedestrian B in two-channel simulation model, for example), it is advantageous or even necessary to decide whether to use the calculated $D_c$. In order to make such a decision, it is possible to obtain the chip index from the solution for the minimization of the MMSE based on a sample sequence of h, according to Krauss et al. It should be noted that the minimization of the MMSE is used to reduce the output mean-square error (MSE) and thus improve the output signal-to-noise ratio (SNR) of the receiver. For this reason, the solution can be referred to as a noise-minimizing chip index.

Let the noise-minimizing chip index for the $k^{th}$ slot be $T_k$, the average value of $T_k$ over a plurality of slots be $<T_k>$ and the zero mean component of $T_k$ be $T_{k,0}=T_k-<T_k>$, we define two random variables as follows:

$T_{k,+}=T_k$, if $T_{k,0}>0$ $T_{k,-}=T_k$, if $T_{k,0}<0$ \quad (6)

We further define $D_{c1}=<T_{k,-}>$ $D_{c2}=<T_k>$ $D_{c3}=<T_{k,+}>$ \quad (7)

and assume that $D_{c1}$, $D_{c2}$ and $D_{c3}$ are the only three possible values for $D_c$ to be used as the target chip index. In order to decide whether the center of mass can be used to predict a good value of the target chip index, a correlation $R_{kc}$ is calculated, or $R_{kc}=E\{D_{c,0}T_{k,0}\}$ \quad (8)

In the above equation, $D_{c,0}=D_c-<D_c>$ and $<D_c>$ is the average of the center-of-mass over a number of slots. If one channel for each slot is used, the calculation of correlation effectively determines whether this method of finding D should be used. Typically, the number of terms in the sample correlation depends on the fade rate. For example, about 25 to 50 samples from independent channels should be sufficient. It has been found that an $R_{kc}$ value of 0.8 or greater could produce a good frame error-rate performance using the center-of-mass $D_c$. Thus, if the $R_{kc}$ value is below 0.8, then a constant value different from the center-of-mass $D_c$ can be used. Alternatively, if the sample correlation value does not reach this predetermined criterion, the noise-minimizing solution $T_k$ can be used.

Accordingly, the following algorithm can be used, after the computation of $D_c$, to decide what target chip index, D, should be used:

```
if D_c = <D_c> then
    D^# = D_c2 ;
else
    if D_c < <D_c> then
        D^# = D_c1 ;
    else
```

```
        D# = D_c3 ;
      end
    end
    if  Use_Dc == TRUE
        D = D#
    else
        D = T_k
    end
```

In the above algorithm, Use_Dc is a Boolean variable which can be set equal to "TRUE" when $R_{kc}$ is greater or equal to 0.8. If Use_Dc is not equal to TRUE, then $T_k$ or another value determined by a partial sampling of all possible D values could be used, as mentioned earlier.

In a different embodiment of the present invention, the neighborhood of the center-of-mass value is used to evaluate the actual tap or filter to be used. Accordingly, the taps associated with a series of chip index values around the computed center-of-mass are used for evaluation. For example, the taps $x(D_c-1)$, $x(D_c)$ and $x(D_c+1)$ are calculated in order to evaluate the corresponding MMSEs, and the tap that results in the lowest MMSE will be selected as the actual tap solution.

Figure 4:
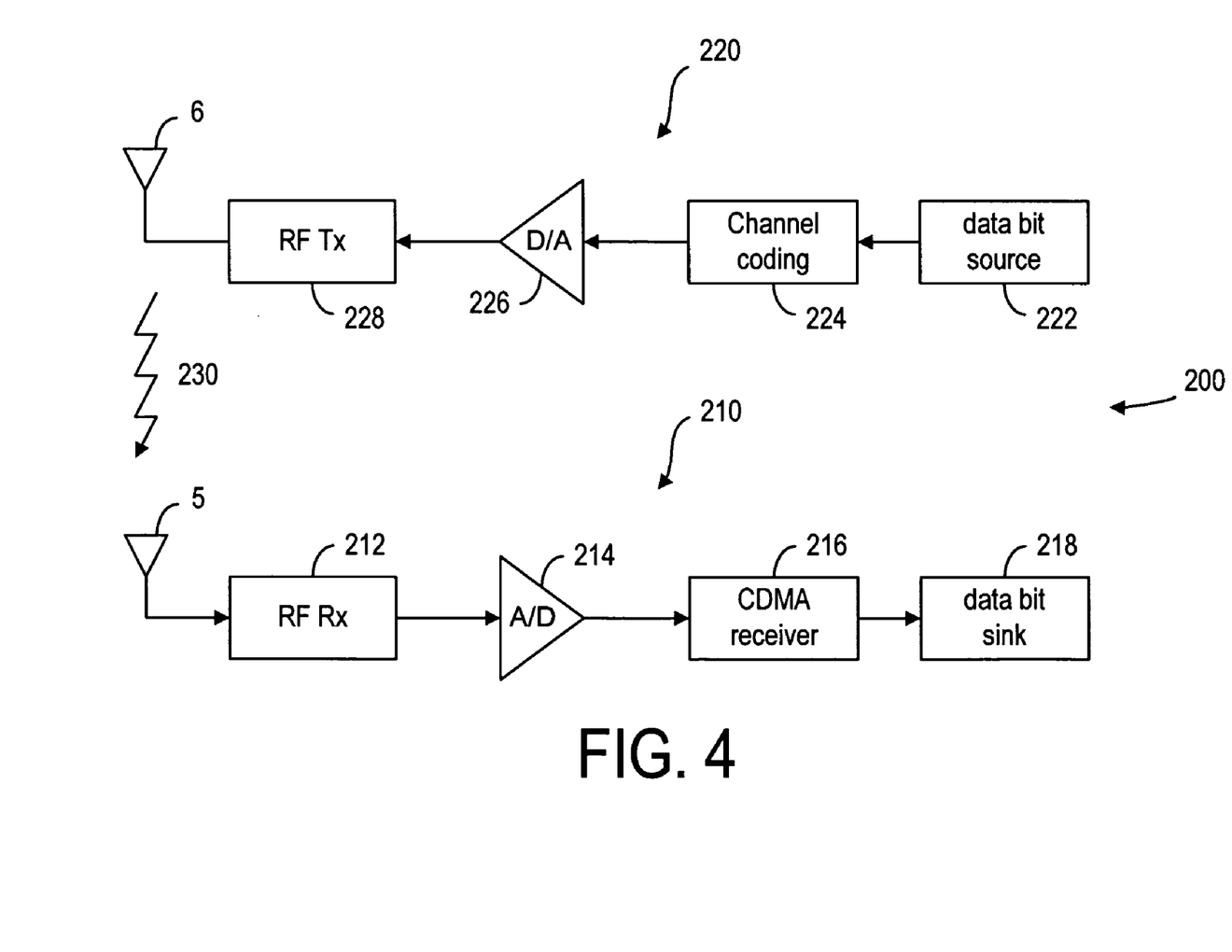
FIG. 4 is a block diagram showing a mobile terminal that uses the receiver of the present invention to receive signals from a base station in a telecommunications network.

The present invention can be used in a network device, such as a mobile terminal in a telecommunications network. As shown in FIG. 4, the telecommunications network 200 has a mobile terminal 210, which is adapted to communicate with a base station 220. The base station 220 comprises a channel coding module 224, which receives digital data from a data bit source 222 and prepares the data for transmission. The data provided by the channel coding module 224 is converted into an analog form by a digital-to-analog converter 226, RF modulated in an RF transmitter 228 and transmitted via an antenna 6. The mobile terminal 210 comprises an RF receiver module 212 connected to an antenna 5 to receive RF signals 230 from the base station 220. After being demodulated by the RF receiver 212, the received data is converted to a digital form by an analog-to-digital converter 214. The digital data is further processed by a CDMA receiver 216 and delivered to a data bit sink 218. The receiver 216 is similar to the receiver 1 of FIG. 2.

In prior art solutions for estimating D, the number of operations is approximately equal to the number of operations in solving for x, which is on the order of $N^2$, where N is the number of equalizer taps. In the present invention, the number operation is less than or approximately equal to 3L, where L is the channel length (L<N). For example, if N is 40 and L is 10, then the number of computation operations, according to the presentation, is much less than 2% of that required in the prior art method, according to Krauss et al.

It should be noted that the present invention has been disclosed in terms of chip-level equalization, which is used in a code division multiple access (CDMA) system, the principle of the present invention is also applicable to a time division multiple access (TDMA) system where system-level equalization is used. This is because the described embodiments do not depend on processing gain. Furthermore, FIG. 2 depicts a single-user receiver having one chip-waveform matched filter. Such a receiver can be used, for example, in a WCDMA phone. However, the present invention can be used in a multi-user receiver having a plurality of chip-waveform matched filters and, for each chip-waveform, a separate module is used to estimate the value of target chip index D based on the center-of-mass method.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method comprising:
   receiving a spread-spectrum signal transmitted using a plurality of transmitted chips through a plurality of channels;
   estimating an instantaneous channel impulse response based on the received signal;
   sampling the estimated instantaneous channel impulse response into a plurality of samples indexed by a plurality of delay sample indices;
   computing a first moment of delay sample indices over the estimated instantaneous channel impulse response;
   determining a target chip index based on the computed first moment, wherein a filter is used in a receiver for filtering data received in the receiver, and the filter is derivable from the target chip index:
   choosing a plurality of chip index values based on the computed first moment;
   associating said plurality of chip index a plurality of filter taps; and
   evaluating filtering performance of said plurality of filter taps for determining the target chip index among said plurality of chip index values based on the filtering performance.

2. The method of claim 1, wherein said plurality of chip index values are greater than the computed first moment.

3. The method of claim 1, wherein said plurality of chip index values are smaller than the computed first moment.

4. The method of claim 1, wherein the filter is derived from a noise-minimizing solution based on a plurality of impulse channel responses, wherein said determining is also based on the noise-minimizing solution for the channels.

5. The method of claim 4, wherein the transmitted chips are used for data transmission in time slots, said method further comprising:
   computing a first index value indicative of an average value of the noise-minimizing solution over a plurality of time slots;
   computing a second index value indicative of an average value of the first moment over said plurality of time slots; and
   computing a correlation coefficient between the first index value and the second index value so as to determine the target chip index based on the correlation coefficient.

6. The method of claim 5, wherein
   the first index value is a zero mean component of the average value of the noise-minimizing solution over said plurality of time slots; and
   the second index value is a zero mean component of the average first moment over said plurality of time slots, wherein the target chip index is derived from the first moment if the correlation coefficient exceeds a predetermined value.

7. The method of claim 6, wherein
   the target chip index is derived from a constant value different from the computed first moment if the correlation coefficient is smaller than the predetermined value.

8. The method of claim 7, wherein
the target chip index is derived from a noise-minimizing solution if the correlation coefficient is smaller than the predetermined value.

9. The method of claim 7, wherein the predetermined value is substantially equal to 0.8.

10. A signal filtering device for use in a receiver in a telecommunication system, the receiver configured to receive a spread-spectrum signal indicative of data transmitted using a plurality of transmitted chips through a plurality of channels, said filtering device comprising:
a processing module for estimating an instantaneous channel impulse response based on the received signal and for sampling the estimated instantaneous channel impulse response into a plurality of samples indexed by a plurality of delay sample indices;
a computation module for computing a first moment of delay sample indices over the estimated instantaneous channel impulse response, and for determining a target chip index based on the computed first moment;
a filter for filtering data received in the received signal, said filter derivable from the target chip index; and
a first module, responsive to the computed first moment, for choosing a plurality of chip index values based on the computed first moment, associating said plurality of chip index values to a plurality of filter taps, and evaluating filtering performance of said plurality of filter taps for determining the target chip index among said plurality of chip index values based on the filtering performance.

11. The signal filtering device of claim 10, wherein said filter is derivable from a noise-minimizing solution based on a plurality of impulse channel responses, and wherein said computation module is configured to determine
the target chip index also based on the noise-minimizing solution for the channels.

12. The signal filtering device of claim 11, wherein the data transmission is carried out in time slots, said device further comprising:
a second module, responsive to the received signal and the computed first moment, for computing
a first index value indicative of an average value of the noise-minimizing solution over a plurality of time slots, and
a second index value indicative of an average value of the first moment over said plurality of time slots, and
for computing a correlation coefficient between the first index value and the second value so as to allow the further module to determine the target chip index based on the correlation coefficient.

13. The signal filtering device of claim 12, wherein
the first index value is a zero mean component of the average value of the noise-minimizing solution over said plurality of time slots; and
the second index value is a zero mean component of the average first moment over said plurality of time slots, wherein the target chip index is derived from the first moment if the correlation coefficient exceeds a predetermined value.

14. The signal filtering device of claim 13, wherein the predetermined value is substantially equal to 0.8.

15. A radio-frequency receiver for receiving a spread spectrum signal, said receiver comprising:
a computation module for computing a first moment of delay sample indices over an instantaneous channel impulse response estimated based on the received signal, and for determining a target chip index based on the computed first moment, wherein the spread-spectrum signal is indicative of data transmitted through a plurality of channels using a plurality of transmitted chips;
a filter for filtering the received signal, said filter derivable from the target chip index; and
a processor, responsive to the computed first moment, for choosing a plurality of chip index values based on the computed first moment, associating said plurality of chip index values to a plurality of filter taps, and evaluating filter performance of said plurality of filter taps so as to allow the computation module to determine the target chip index among said plurality of chip index values based on the filtering performance.

16. A mobile terminal configured to receive a spread-spectrum signal, comprising:
a computation module for computing a first moment of delay sample indices over an instantaneous channel impulse response estimated based on the received signal, and for determining a target chip index based on the computed first moment; a filter for filtering data in the received signal, said filter derivable from the target chip index; and
a processor, responsive to the computed first moment, for choosing a plurality of chip index values based on the computed first moment, associating said plurality of chip index values to a plurality of filter taps, and evaluating filtering performance of said plurality of filter taps so as to allow the computation module to determine the target chip index among said plurality of chip index values based on the filtering performance.

17. A signal filtering device for use in a receiver in a telecommunication system, the receiver configured to receive a spread-spectrum signal, said device comprising:
means for estimating an instantaneous channel impulse response based on the received signal;
means for sampling the instantaneous channel impulse response into a plurality of samples indexed by a plurality of delay sample indices;
means for computing a first moment over the instantaneous channel impulse response; and
means, responsive to the computed first moment, for determining a target chip index based on the computed first moment, wherein the receiver comprises means for filtering the signal received in the receiver, said filtering means derivable from the target chip index, said signal filtering device further comprising:
means for choosing a plurality of chip index values based on the computed first moment; associating said plurality of chip index values to a plurality of filter taps; and evaluating filtering performance of said plurality of filter taps so as to determine the target chip index among said plurality of chip index values based on the filtering performance.

* * * * *

UNITED STATES PATENT AND TRADEMARK OFFICE
CERTIFICATE OF CORRECTION

PATENT NO. : 7,269,207 B2
APPLICATION NO. : 10/359472
DATED : September 11, 2007
INVENTOR(S) : Lilleberg et al.

It is certified that error appears in the above-identified patent and that said Letters Patent is hereby corrected as shown below:

Column 8, line 27, claim 1, line 18, after "index", --values to-- should be inserted.

Column 9, line 2, claim 8, line 2, "a" should be deleted and --the-- inserted.

Signed and Sealed this

Twenty-fifth Day of March, 2008

JON W. DUDAS
*Director of the United States Patent and Trademark Office*